United States Patent Office 3,433,770
Patented Mar. 18, 1969

3,433,770
ADDITION OF DIARYL ESTER TO POLYCON-
DENSATION STEP OF POLYESTERIFICA-
TION PROCESS
Takeo Shima and Hisashi Yamada, Iwakuni-shi, Japan,
assignors to Teijin Limited, Kita-ku, Osaka, Japan, a
corporation of Japan
No Drawing. Filed May 24, 1965, Ser. No. 458,377
Claims priority, application Japan, June 1, 1964,
39/30,851, 39/30,852
U.S. Cl. 260—75          9 Claims
Int. Cl. C08g 17/003, 17/08

ABSTRACT OF THE DISCLOSURE

An improved process for preparing linear polyesters from dicarboxylic acids and dihydric alcohols wherein polyesters of a high degree of polymerization are prepared at a high polymerization rate, the improvement which comprises adding a diaryl ester of a dicarboxylic acid to the reaction mixture of the polycondensation reaction step when such reaction mixture has a viscosity of not less than 0.35.

This invention relates to a process for the quick preparation of high polyester, particularly high polyester having fiber- or film-forming ability.

As well known, synthesis of polyester has been heretofore performed by the steps of reacting a dibasic acid or its lower aliphatic ester with a dihydric alcohol or its functional derivatives to form monomer, dihydric alcohol ester of the said dibasic acid, or lower polymer and then subjecting the same to condensation polymerization by heating in the presence of a catalyst while removing the said dihydric alcohol from the reaction system. For instance, in the conventional preparation of polyethylene terephthalate practiced for these long years, terephthalic acid or its lower alkyl ester is reacted with ethylene glycol to form bis-β-hydroxyethyl terephthalate (monomer) or its lower polymer, and the product is then heated in the presence of a suitable catalyst to produce polyethylene terephthalate of high degree of polymerization.

In the conventional synthesis of polyester as above described, however, the rate of polymerization gradually decreases due to such causes as the gradual decrease of hydroxyl groups with the progress in the condensation polymerization, and the breakage in the main chain of the polymer caused by the thermal decomposition reaction which takes place besides the main, desired reaction because of the conventionally employed reaction temperature of 200°–350° C., preferably 260°–320° C. The result of such breakage in the main chain is that at the termini of the polymer hydroxyl groups are gradually decreased while the number of carboxyl groups is increased.

Accordingly, in case of synthesizing highly polymerized polyethylene terephthalate by means of melt polymerization, the rate of rise in the degree of polymerization gradually decreases even to the point after which no rise in the degree of polymerization can be observed, and if the reaction is further continued the rate of thermal decomposition becomes greater than that of polymerization so that the molecular weight of the product polymer is on the contrary reduced.

Therefore in the conventional process as above described, there is a limit to the degree of polymerization of polyester obtainable. Under the polymerization conditions employed on industrial scale, for example, it is extremely difficult to produce polyester having an intrinsic viscosity of above about 0.8 (as measured at 35° C. in orthochlorophenol as the solvent). Again in order to produce such high polyester, considerably long reaction time (about 7–8 hours) is required for its polymerization stage.

Whereas it was recently found that polyester of high degree of polymerization having an intrinsic viscosity of 1 or above is excellent as the material for particularly such industrial fibers as tire cord, for which high strength and high fatigue resistance are required, and for this reason researches on the preparation of such high polyesters are advanced at various quarters.

As one of the processes for preparing such high polyesters, solid phase polymerization process is known, which comprises heating low polyester in finely divided state or solid form having a large surface area such as fiber to a temperature lower than the melting point of the polyester in an inert gaseous current or in vacuum to convert the same to polyester of high degree of polymerization.

However polyester obtained from such solid phase polymerization process cannot be free from adsorption of trace of oxygen which takes place at the time of the polymerization, and as the result is oxidized and decomposed when melted, consequently showing remarkable lowering in the degree of polymerization. Thus it is difficult to obtain fibers having high strength and elongation from such polyester.

It is also known that the rate of polymerization can be greatly increased by the use of large amounts of a catalyst such as antimony trioxide and titanic isopropoxide for the polymerization of polyester. However, when such a catalyst is used in a large amount to obtain a high polymer, the resultant product becomes blackish or is colored yellow to brown and comes to have a notably lowered softening point and less heat stability. For these reasons, it is again impractical to depend on the use of such catalyst for obtaining commercial high polyesters.

As has been described, it is extremely difficult to produce high polyester as the material for shaped products having high strength and elongation on commercial scale by any of the heretofore known methods.

Accordingly, the object of the present invention is to provide an industrial process for producing high polyester having an intrinsic viscosity of 0.8 and above, particularly 0.85 and above, which cannot be obtained by the conventional melt process.

A further object of the invention is to provide a process for producing high polyester of about the same order of degree of polymerization as of those heretofore obtained, within shortened polymerization reaction time.

Another object of the invention is to provide a process for quickly producing high polyester which is not undesirably colored, and which can be formed into shaped products having high strength and high fatigue resistance.

A still further object of the invention is to provide a process for quickly producing high polyester of small free carboxyl group content.

Other objects of the invention will become apparent from reading the following specification.

According to the present invention, the above objects and advantages are achieved by adding, to molten polyester having an intrinsic viscosity of no less than 0.35 (as calculated from the value measured as to its orthochlorophenol solution at 35° C.: This applies to all the intrinsic viscosities which appear in this specification hereafter), which is obtained from the reaction of at least one dibasic acid or its lower aliphatic ester with at least one dihydric alcohol or its functional derivatives, a diaryl ester of dicarboxylic acid represented by the formula

wherein $n$ is an integer selected from the group consisting of zero and 1; X is a divalent organic group; A and B stand for monovalent aryl groups of 6 to 20 carbons which may have at least one type of non-ester-forming substituent group on their aromatic rings, and A and B may be the same or different;
(hereinafter this diaryl ester is referred to as diaryl dicarboxylate), and continuing heating in the presence of a condensation polymerization catalyst in at least one type of atmosphere selected from the group consisting of that under reduced pressure and that of inert gaseous current.

The above formula representing the diaryl dicarboxylate used in the present invention, when $n$ is zero, becomes

AOOC—COOB which is a diaryl ester of oxalic acid. In that case, A and B representing monovalent aryl groups may be the same or different, and their aromatic rings may have any substituent group other than ester-forming functional group.

Again if $n$ is one in the above formula, it becomes

AOOC—X—COOB in which case X, A and B have the signification as already defined.

In the diaryl carboxylate used in the present invention, the X in the formula

AOOC$(X)_n$COOB may be, for example, a divalent aromatic group such as phenylene, naphthylene and diphenylene; any of the above aromatic groups which are substituted by, for example, alkyl group and/or halogen; a divalent aromatic group in which the aromatic rings are bonded through other atom or atomic group such as

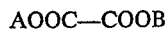, 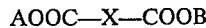

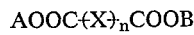

and

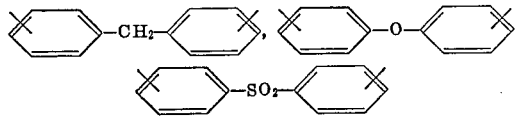

a divalent aliphatic group such as ethylene, pentylene and neopentylene; a divalent alicyclic group such as cyclohexylene and cyclohexane dimethylene; a divalent aralkylene group such as xylylene and haloxylylene; or a divalent group of very large number of carbons such as that represented by the formula

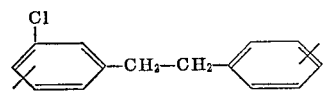

or that of the formula

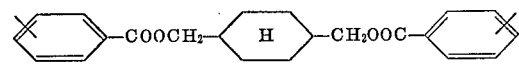

(in which $n$ is 0 or a positive integer less than 100).

And, A or B stands for an aryl group of no more than 20 carbons such as, for example, a monovalent aromatic group such as phenyl, phenyl-phenyl, and naphthyl; a monovalent substituted aromatic group such as tolyl, xylenyl, methylnaphthyl and halogen-substituted naphthyl; and a monovalent aromatic group in which the aromatic rings are bonded through other group, such as phenoxyphenyl, chlorophenoxyphenyl and phenyl sulphonylphenyl.

More specifically, the preferred diaryl dicarboxylate to be added in accordance with the subject process include: diphenyl terephthalate, ditolyl terephthalate, phenylphenyl tolyl terephthalate, diphenoxyphenyl terephthalate, diphenyl phenyl diphenylmethane-dicarboxylate, diphenyl diphenylsulphone-dicarboxylate, dichlorophenyl oxalate, phenyl phenyl diphenylmethane-dichrboxylate, diphenyl diphenylsulphone-dicarboxylate, dichlorophenyl oxalate, diphenyl succinate, diphenyl adipate, dinaphthyl sebacate, diphenyl neopentane-dicarboxylate, dibenzylphenyl xylene-dicarboxylate, the compound of the formula

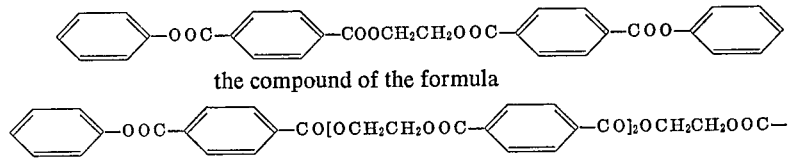

the compound of the formula

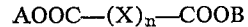

and mixtures of these compounds.

Again, the preferred dicarboxylic acids used to produce the polyester desired in the present invention include terephthalic, isophthalic, phthalic, methyl-terephthalic, chloroterephthalic, naphthalene-dicarboxylic, diphenyl-dicarboxylic, diphenylsulphone dicarboxylic, diphenylketone-dicarboxylic, diphenylether-dicarboxylic, diphenylmethane-dicarboxylic, adipic, sebacic, cyclohexane-dicarboxylic and cyclohexane-diacetic acids, and mixtures of these dibasic acids. The preferred lower aliphatic esters of such acids useful in the invention include dimethyl esters, diethyl esters and dipropyl esters of the above-named dicarboxylic acids and mixtures thereof.

Furthermore, the dihydric alcohols used preferably for obtaining the object polyester of the invention include ethylene glycol, trimethylene glycol, propylene glycol, hexamethylene glycol, decamethylene glycol, neopentylene glycol, cyclohexane dimethanol, cyclohexane diol, xylylene glycol and mixtures of these dihydric alcohols. As the functional derivatives of the above dihydric alcohols, those compounds such as ethylene oxide, propylene oxide, ethylene carbonate and propylene carbonate are listed.

The process of the present invention is also applicable to the preparation of polyester from mixtures of these dicarboxylic acids or their lower alkyl esters and these dihydric alcohols and, besides the said two components, minor ratios of hydroxy acid derivatives such as, for example, p-($\beta$-hydroxyethoxy)benzoic acid or its lower aliphatic esters.

The diaryl dicarboxylate of the formula

AOOC—$(X)_n$—COOB used in the present invention is, as aforesaid, dicarboxylic acid diester of the phenols represented as AOH and BOH.

According to our researches, when an aliphatic ester such as diethyl terephthalate is used, the rate of polymerization is lowered compared with the case of ordinary polymerization reaction of polyester in which none of such additive is used, and the resultant polyester also has a lowered degree of polymerization. In contrast, when the diaryl dicarboxylate as defined in this invention is added, the rate of polymerization increases, and it is found that polyester of greater degree of polymerization than that of the polyester formed in the absence of the said additive results.

Whereas if A or B in the above formula of the diaryl dicarboxylate is an aryl group of more than 20 carbons, addition of such a diaryl dicarboxylate does not cause any appreciable rise in the rate of polymerization, but in certain cases rather invites decrease in the degree of polymerization. Therefore addition of such should be avoided. Accordingly, any aryl group in the diaryl dicarboxylate used in the subject process should not have more than 20 carbons, preferably less than 15 carbons, including the carbons in the substituent group therein if applicable.

According to the present invention, the said diaryl dicarboxylate must be added to molten polyester having an intrinsic viscosity of no less than 0.35. Because, the addition of the diaryl dicarboxylate before the intrinsic viscosity of the polyester reaches 0.35 completely fails to achieve the objects of the invention. Again in the present invention it is generally advantageous to add the diaryl dicarboxylate to polyester having an intrinsic viscosity of no more than 1.5, preferably no more than 1.2. The reason therefore is that if it is added to polyester having an intrinsic viscosity greater than 1.2, particularly greater than 1.5, a uniform mixing is difficult to be performed due to the too great a melt viscosity of such polyester.

Accordng to our researches, it is found that the maximum allowable amount of addition of the diaryl dicarboxylate generally depends on the intrinsic viscosity of the polyester at the time of the addition, and that it is necessary to add the amount no more than the amount (M) which satisfies the formula $$M \leq (\eta_0)^2 - 3.5(\eta_0) + 3.2$$

in which $(\eta_0)$ is the intrinsic viscosity of the polyester at the time of addition of the diaryl dicarboxylate and is a positive number of no less than 0.35 and preferably no more than 1.5; and M is the maximum allowable amount of addition of the diaryl dicarboxylate expressed in mol percent to the acid component of the polyester;

as the amount of single time addition. Further, it is particularly preferred to add ⅔M or less of the diaryl dicarboxylate. The results of adding the diaryl dicarboxylate in an amount greater than M at one time somewhat differ depending on the specific type of the diaryl dicarboxylate, but in certain cases the intrinsic viscosity of the finally obtained polyester is on the contrary lowered. Therefore, single time addition of the diaryl dicarboxylate in an amount greater than M should generally be avoided.

While there is no rigid lower limit to the amount of addition of the diaryl dicarboxylate, when the total amount of addition thereof is in the order of (⅓M+0.01) mol percent to the total amount of the acid component of polyester, an appreciable and desirable influence can be observed on the increase in the rate of polymerization and the rise in the intrinsic viscosity of the resultant polyester. Of course it is not true that the less amount of addition than the above has no effect.

In the present invention, degree of rise in the viscosity of polyester due to the addition of the diaryl dicarboxylate varies depending on specific type of the diaryl dicarboxylate, time of addition, reaction time after the addition and operational conditions of the polymerization. Therefore, it is desirable to suitably select these conditions in accordance with each specific reaction performed.

According to the present invention, the diaryl dicarboxylate as above defined, preferably in the amount as above described, is added to molten polyester having an intrinsic viscosity of no less than 0.35, mixed, and thereafter the mixture is heated for a desired period in the presence of condensation polymerization catalyst and at reduced pressure and/or in an inert gaseous current. The heating should be continued for at least 5 minutes, preferably no shorter than 10 minutes, until preferably the polyester having the desired degree of polymerization is formed. The condensation polymerization catalyst used at that time may be any known condensation polymerization catalyst useful for polyester-forming reaction. As such condensation polymerization catalyst, for example, antimony compounds such as antimony trioxide, antimony pentoxide and antimony trichloride; titanium compounds such as titanium tetraalkoxide and titanium trialkoxide; aliphatic or aromatic organic acid salts such as acetates and benzoates and inorganic acid salts such as carbonates and borates, of zinc, manganese or lead; may be named.

In practicing the present invention, it is permissible to add other delusterant such as titanium dioxide and stabilizer such as phosphorous acid.

Again in practicing the process of this invention, the diaryl dicarboxylate is conveniently added to the reaction system for conventionally known polyester preparation in the presence of known condensation polymerization catalyst, at the optional stage after the intrinsic viscosity of the polymer formed reached 0.35. Whereas, it is also possible to remelt the polymer having an intrinsic viscosity of 0.35 or above of which synthesis is once completed, and to apply thereto the process of this invention. In either of the above cases, the additive, i.e., the diaryl dicarboxylate, may be added by single time addition, continuously or intermittently at regular time intervals.

It is likewise possible to repeat the subject process twice or more in order to produce polyester of high degree of polymerization.

In case the diaryl dicarboxylate is added continuously or intermittently as aforesaid, or when the subject process is repeated twice or more as in the case wherein certain required amount of the diaryl dicarboxylate is added to molten polyester followed by heating for a predetermined period under suitable conditions to raise the intrinsic viscosity of the polyester to a certain point and thereafter further the required amount of the diaryl dicarboxylate is added to the said polyester in molten state followed again by heating for a predetermined period under suitable conditions, the total amount of the diaryl dicarboxylate added before completion of the reaction may of course exceed the value M given by the foregoing inequality $$M \leq (\eta_0)^2 - 3.5(\eta_0) + 3.2$$

without any objectionable consequence. Namely, M is the maximum allowable amount of the diaryl dicarboxylate at one time addition.

The diaryl dicarboxylate added in accordance with the subject process is integrated with the main chain of the polymer. This is apparent from such facts as that the diaryl dicarboxylate can hardly be separated by extraction from the polymer obtained, and that during the reaction phenols are distilled.

Judging from these facts, the diaryl dicarboxylate employed in the present invention is integrated with the polymer in accordance with the reaction formula

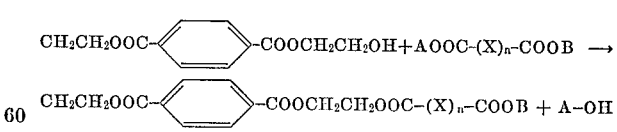

and therefore evidently the number of terminal hydroxyl groups decreases similarly to the case of conventional melt preparation of polyester. The logical inference which follows will be that the addition of such a compound will rather lower the rate of polymerization of the polyester. Nevertheless, in accordance with the present invention it is possible to notably shorten the condensation polymerization time of polyester compared with the case of conventional processes, and furthermore to readily obtain polyester of such high degree of polymerization as cannot be obtained by the conventional melt polymerization process.

When the diaryl dicarboxylate is added in accordance with the subject process, for example, in case of preparation of polyethylene terephthalate, the time required for raising the intrinsic viscosity of the formed polymer from 0.5 to 0.85 is shortened to one-fifth of that required in the absence of the additive. Again, while according to the subject process the time required to raise the degree of polymerization of the said polyethylene terephthalate by the range corresponding to the rise in its intrinsic viscosity of from 0.5 to 1.15 is only 20 minutes or less, when the additive is not employed after 150 minutes or longer period of the melt condensation polymerization the resultant polyester has an intrinsic viscosity of at most 0.8 or around and it is impossible to raise its intrinsic viscosity to 1.15. Prolonged reaction time would rather invite lowering in the degree of polymerization due to thermal decomposition of the polymer formed, and coloration of the polymer.

Thus the process of the present invention brings about the effect which can never be inferred from the theories of condensation polymerization of polyester established in the past.

The high polyester prepared in accordance with the subject process is quite similar to conventionally prepared polyester in physical and chemical properties, excepting the differences due to the high degree of polymerization possessed by the former. To wit, the high polyester obtained in accordance with the subject process, for example, polyethylene terephthalate, has substantially the same softening point as of ordinary polyester, and the fibers prepared therefrom also have about the same order of dyeability with disperse dyes to that the fibers of conventionally prepared polyester.

Again the color tone of the high polyester is better than that of polyester of high degree of polymerization obtained by heretofore known processes, and the former also has excellent heat stability at the time of melting. Furthermore, since in accordance with the subject process polyester having a high intrinsic viscosity can be obtained within a short period of polymerization reaction, the resultant polyester inevitably has a small free carboxyl group content formed by thermal decomposition, and therefore is excellent as the material for shaped products of high fatigue resistance.

The process of the present invention is very advantageous when practiced using commercial scale production equipments, particularly in case of continuously polymerizing and spinning polyethylene terephthalate of high degree of ploymerization without making chips thereof.

The present invention is explained in further detail as to the examples given below, in which parts are by weight. The measurement of carboxyl group was performed by the method of Majewska, and that of hydroxyl group was done by the method of Warzywada [of. Melliand, No. 45 (May 1962) p. 483].

Examples 1–4 and Controls 1–5

97 parts of dimethyl terephthalate, 69 parts of ethylene glycol, 0.04 part of antimony trioxide and 0.088 part of calcium acetate were charged in a reactor provided with a rectification column, and heated while the methanol formed was distilled off the system. After the distillation and removal of the methanol was completed, the excessive glycol started to be distilled, which was also removed from the system. When the inside temperature of the system reached 230° C., the reaction product (precondensate) was transferred into another reactor, to which 0.08 part of 50% aqueous solution of phosphorous acid was added, and the inside temperature of the reaction system was gradually raised to 260° C. within about 30 minutes while the system was reacted under agitation at a reduced pressure of 20 mm. Hg. Then the inside temperature of the reaction system was quickly raised to 275° C. and the reaction was continued for a predetermined period in high vacuum of 0.1–1 mm. Hg under agitation of 60 r.p.m. Thereafter the pressure was made atmospheric by addition of nitrogen and a predetermined amount of diphenyl terephthalate was added to the system at one time, followed by further 20 minutes of reaction in the high vacuum of 0.1–1 mm. Hg and at 275° C. under agitation of 60 r.p.m.

The above reaction was performed nine times varying each time the reaction time in the high vacuum before the addition of diphenyl terephthalate and addition amount thereof as indicated in Table 1 below, in which the intrinsic viscosity of polyethylene terephthalate immediately before the addition of diphenyl terephthalate and that of polyethylene terephthalate after the entire reaction was completed in each case are also given.

TABLE 1

| Exp. No. | High vacuum reaction time before addition of diphenylterephthalate (min.) | Intrinsic viscosity of polyester immediately before addition of diphenyl terephthalate | Addition amount of diphenylterephthalate (parts by weight and mol percent to terephthalic acid component) | Intrinsic viscosity of polyester after 20 minutes of high vacuum reaction following addition of diphenyl terephthalate | Softening point (°C.) | Color tone |
|---|---|---|---|---|---|---|
| Control 1 | 30 | 0.37 | | | 263.5 | Colorless. |
| Control 2 | 60 | 0.54 | | | 262.8 | Do. |
| Control 3 | 90 | 0.65 | | | 262.5 | Do. |
| Control 4 | 120 | 0.75 | | | 261.9 | Light yellow. |
| Control 5 | 150 | 0.81 | | | 261.5 | Yellow. |
| Example 1 | 30 | 0.35 | 3.5 (2.2 mol percent) | 0.87 | 261.4 | Colorless. |
| Example 2 | 60 | 0.56 | 1.0 (0.6 mol percent) | 1.02 | 260.3 | Do. |
| Example 3 | 60 | 0.55 | 1.9 (1.2 mol percent) | 1.01 | 260.3 | Do. |
| Example 4 | 90 | 0.66 | 0.7 (0.4 mol percent) | 1.10 | 259.7 | Do. |

Examples 5–10 and Controls 6–9

Under exactly the same conditions as of Examples 1–4 excepting that the high vacuum reaction time after addition of diphenyl terephthalate was made 40 minutes, polyethylene terephthalate was synthesized. The results were as shown in Table 2 below.

In the said Table 2, Controls 6, 7 and 8 are the cases wherein the intrinsic viscosity of polyethylene terephthalate was lower than 0.35 at the time of addition of diphenyl terephthalate thereto, with the result that in none of the controls polyester of high degree of polymerization was obtained. It is therefore apparent that the addition at the point at which the intrinsic viscosity of polyester is below 0.35 cannot achieve the objects of the present invention. In Control 9 the intrinsic viscosity of polyester at the time of the diphenyl terephthalate addition was above 0.35, but because the amount of the additive exceeded 1.5 mol percent, the upper limit in that case, the objects of the invention could not be achieved.

TABLE 2

| Exp. No. | High vacuum reaction time before addition of of diphenyl terephthalate | Intrinsic viscosity of polyester immediately before addition of diphenyl terephthalate | Addition amount of diphenyl terephthalate (parts by weight and mol percent to terephthalic acid component) | Intrinsic viscosity of polyester after 40 minutes of high vacuum reaction following addition of diphenyl terephthalate | Softening point (° C.) |
|---|---|---|---|---|---|
| Example 5 | 30 | 0.35 | 3.5 (2.2 mol percent) | 0.99 | 260.5 |
| Example 6 | 60 | 0.56 | 1.0 (0.6 mol percent) | 1.16 | 259.5 |
| Example 7 | 60 | 0.55 | 1.9 (1.2 mol percent) | 1.26 | 258.7 |
| Example 8 | 90 | 0.66 | 0.7 (0.4 mol percent) | 1.25 | 258.5 |
| Example 9 | 75 | 0.63 | 0.24 (0.15 mol percent) | 0.98 | 260.2 |
| Example 10 | 75 | 0.63 | 0.5 (0.3 mol percent) | 1.01 | 260.0 |
| Control 6 | 0 | 0.1 | 18 (11 mol percent) | 0.32 | 263.5 |
| Control 7 | 0 | 0.1 | 9 (5.5 mol percent) | 0.52 | 262.8 |
| Control 8 | 15 | 0.18 | 3.2 (2 mol percent) | 0.55 | 262.7 |
| Control 9 | 70 | 0.58 | ....do.... | 0.65 | 260.1 |

The polymer having an intrinsic viscosity of 1.26 which was obtained in Example 7 was maintained at molten state in nitrogen current of 285° C. After an hour, its intrinsic viscosity was 1.13, and its carboxyl group content was 21 eq./$10^6$ g. On the other hand, when polyethylene terephthalate having an intrinsic viscosity of 1.23 obtained by solid phase polymerization was maintained at molten state in nitrogen current of 285° C. for an hour, it had an intrinsic viscosity of 0.87 and a carboxyl group content of 51 eq./$10^6$ g. Therefore it can be understood that although it is possible to prepare polyester of high degree of polymerization by solid phase polymerization, the thermal decomposition of the polyester at the time of its melt shaping is conspicuous, and that its heat stability at the time of melting is much inferior.

Controls 10–13

In these controls terephthalic acid was directly reacted with ethylene glycol and it is thereby demonstrated that the prolonged polymerization time cannot produce the polymer of intrinsic viscosity higher than 0.86, but rather the intrinsic viscosity tends to be lowered with increase in the polymerization time, and the number of terminal carboxyl groups increases.

83 parts of terephthalic acid, 70 parts of ethylene glycol and 0.055 part of basic zinc carbonate were charged in an autoclave provided with a distillation column, and heated to 240° C. at a pressure of 2.4 kg./cm².

The water formed was continuously distilled off the system through the distillation column, and the reaction was completed after 90 minutes. To the reaction product then 0.040 part of antimony pentoxide and 0.05 part of 85% aqueous solution of phosphoric acid were added, and the reaction vessel was placed in a salt bath of 290° C. After excessive ethylene glycol was distilled off for 30 minutes, the system was further reacted for 30 minutes at 20 mm. Hg and the reaction was continued at a high vacuum of 0.1 mm. Hg under agitation of 60 r.p.m., which was stopped when lowering in intrinsic viscosity of the polymer due to decomposition was observed with the progress of the high vacuum reaction time.

The resutls are shown in Table 3.

Example 11

In exactly the same manner of operation as in Controls 10–13 a condensation polymerization was performed, and after 30 minutes of the high vacuum reaction when the intrinsic viscosity of the polymer was 0.48, 1.9 parts of diphenyl terephthalate (1.4 mol percent to the terephthalic acid component) was added to the system. During the following 20 minutes of the high vacuum reaction under agitation of 60 r.p.m., the intrinsic viscosity of the reaction product rose to 1.15 and its carboxyl group concentration became 14 eq./$10^6$ g.

Example 12

To the polyethylene terephthalate having an intrinsic viscosity of 0.54 obtained in Control 2, 0.3 part of di-O-methylphenyl terephthalate (0.17 mol percent to the terephthalic acid component) was added, followed immediately by 20 minutes of the high vacuum reaction. The resultant polyethylene terephthalate had an intrinsic viscosity of 0.80. This polyethylene terephthalate in molten state was further added with 0.3 part of di-p-chlorophenyl terephthalate (0.16 mol percent to the terephthalic acid component) and subjected to further 20 minutes of the high vacuum reaction. Thus obtained polyethylene terephthalate had an intrinsic viscosity of 0.95.

When the above polyethylene terephthalate having an intrinsic visocsity of 0.95 was further reacted in the high vacuum for additional 20 minutes in molten state, its intrinsic viscosity rose to 1.13.

Controls 14 and 15

These controls are to demonstrate the fact that the use of terephthalate other than the diaryl terephthalate cannot achieve the objects of the present invention. Under exactly the same conditions as in Examples 1–4 except that dicyclohexyl terephthalate in place of diphenyl terephthalate was added to polyethylene terephthalate, polyethylene terephthalate was synthesized.

The results are shown in Table 4 below.

TABLE 3

| | Polymerization time (min.) | Intrinsic viscosity of polyester | Terminal hydroxyl group content (eq./$10^6$ g.) | Terminal carboxyl group content (eq./$10^6$ g.) |
|---|---|---|---|---|
| Control No.: | | | | |
| 10 | 30 | 0.47 | 127 | 13 |
| 11 | 60 | 0.73 | 65 | 15 |
| 12 | 90 | 0.86 | 45 | 17 |
| 13 | 150 | 0.85 | 15 | 45 |

TABLE 4

| | High vacuum reaction time before addition of dicyclohexyl terephthalate (min.) | Intrinsic viscosity of polyester at the time of dicyclohexyl terephthalate addition | Addition, amount of dicyclohexyl terephthalate (parts by weight and mol percent to terephthalic acid component) | Intrinsic viscosity of polyester after 20 minutes of high vacuum reaction following addition of dicyclohexyl terephthalate | Softening point (° C.) |
|---|---|---|---|---|---|
| Control No.: | | | | | |
| 14 | 60 | 0.55 | 0.8 (0.5 mol percent) | 0.49 | 262.6 |
| 15 | 60 | 0.55 | 1.65 (1.0 mol percent) | 0.44 | 262.8 |

Examples 13–16 and Control 16

Condensation polymerization reactions were performed under the same operational conditions as in Examples 1–4. The resultant polyester were subjected to the further reaction under the same conditions with agitation of 60 r.p.m for each predetermined period. Thereafter the pressure was made atmospheric with nitrogen, and to each of the system specific additive as indicated in Table 5 was added in the amount as indicated. Thereafter the reactions were continued for additional 30 minutes in high vacuum of 0.1–1 mm. Hg at 275° C. with stirring. The intrinsic viscosities of the polyethylene terephthalates at the time of addition of the additives and after completion of the entire reaction are shown in Table 5 below.

TABLE 5

| Exp. No. | Additive | Addition, amount of additive (mol percent to terephthalic and isophthalic acid components) | High vacuum reaction time before addition of additive (min.) | Intrinsic viscosity of polyethylene terephthalate at the time of addition of additive | Intrinsic viscosity of polyethylene terephthalate after 30 minutes of high vacuum reaction following addition of additive | Softening point (° C.) |
|---|---|---|---|---|---|---|
| Example 13 | Diphenyl isophthalate | 2.2 | 35 | 0.40 | 0.85 | 255.8 |
| Example 14 | do | 0.6 | 70 | 0.60 | 1.01 | 259.3 |
| Example 15 | Diphenyl adipate | 0.6 | 75 | 0.62 | 0.97 | 260.0 |
| Example 16 | Di-o-phenylphenyl | 0.3 | 90 | 0.67 | 0.92 | 259.8 |
| Control 16 | Diphenyl isophthalate | 3.5 | 75 | 0.60 | 0.63 | 253.3 |

In Control 16 given in the above Table 5, the intrinsic viscosity of polyethylene terephthalate at the time of addition of diphenyl isophthalate was 0.6, and because the addition amount of the additive exceeded 1.46 mol percent which is the upper limit corresponding to that intrinsic viscosity, the objects of the present invention could not be achieved.

Example 17

74 parts of terephthalic acid, 9 parts of isophthalic acid, 70 parts of ethylene glycol and 0.08 part of calcium acetate were charged in an autoclave provided with a distillation column, and heated to 240° C. at an elevated pressure of 2.4 kg./cm.$^2$. The water formed was continuously distilled off the system through the distillation column until the reaction was completed after 90 minutes. Thereafter 0.04 part of antimony pentoxide and 0.07 part of 85% aqueous solution of phosphoric acid were added to the system, and the reaction vessel was placed in a salt bath of 290° C. to distill off the excessive ethylene glycol for 30 minutes. Then the reaction was continued for the first 30 minutes at 20 mm. Hg and then in high vacuum of 0.1 mm. Hg under agitation of 60 r.p.m. After 60 minutes of the high vacuum reaction, the intrinsic viscosity of the resultant polymer reached 0.72, and after 90 minutes, 0.87. On the other hand, when 1.0 part of diphenyl isophthalate (0.63 mol percent to the terephthalic and isophthalic acid components) was added to the system after 60 minutes of the above high vacuum reaction and the reaction was continued for additional 30 minutes, a polyethylene isophthalate-terephthalate copolymer having an intrinsic viscosity of 1.13 and a softening point of 238.7° C. was obtained.

Example 18

97 parts of dimethyl terephthalate, 69 parts of ethylene glycol, 0.05 part of antimony pentoxide and 0.088 part of calcium acetate were charged in a reactor provided with a rectification column, and heated while the methanol formed was distilled and removed from the system. As the distillation of methanol terminated and that of the excessive glycol started, the said glycol was also removed from the system. When the inside temperature of the system reached 235° C., the reaction product (precondensate) was transferred into another reactor, to which 0.07 part of 85% aqueous solution of phosphoric acid was added. Then the system was reacted for about 30 minutes while the inside temperature was gradually raised to 270° C. at 20 mm. Hg under agitation of 60 r.p.m. Then the temperature was quickly raised to 280° C. and the reaction was continued in high vacuum of 0.1–0.3 mm. Hg. After 60 minutes of the high vacuum reaction, the pressure was made atmospheric with nitrogen, and sampling was performed. The polymer formed by that time had an intrinsic viscosity of 0.60. To the same molten polymer, 0.7 part of diphenyl terephthalate in molten state was added followed by agitation for 2 minutes at atmospheric pressure. Then the agitation was stopped and the reaction pressure was gradually reduced to 0.1–0.2 mm. Hg within 20 minutes. That high vacuum state was maintained for 80 minutes during which the inside temperature of the system was always maintained at 280°±1° C. After termination of the reaction, the product polymer had an intrinsic viscosity of 1.81, a carboxyl group concentration of 15 eq./10$^6$ g., and a melting point of 255° C.

In a reaction similar to the above, when the agitation for 2 minutes following the addition of 0.7 part of molten diphenyl terephthalate at atmospheric pressure was further continued at 60 r.p.m. while the pressure was gradually reduced to 0.1–0.2 mm. Hg within 20 minutes and the system was reacted for 80 minutes in that state, the polymer after termination of the reaction had an intrinsic viscosity of 1.23, a carboxyl group concentration of 21 eq./10$^6$ g., and a melting point of 258° C.

Example 19

111 parts of diethyl isophthalate, 69 parts of ethylene glycol, 0.04 part of antimony trioxide and 0.049 part of zinc acetate were charged in a reactor provided with a rectification column and reacted under heating, while the ethanol formed was distilled off the system. As the distillation of ethanol completely terminated and that of the excessive glycol started, the latter was also removed from the system. When the inside temperature of the reaction system reached 230° C., the reaction product (precondensate) was transferred into another reactor. Then 0.08 part of 50% aqueous solution of phosphorous acid was added to the system, and the inside temperature was gradually raised to 260° C. within about 30 minutes while the system was reacted at 20 mm. Hg under agitation of 60 r.p.m. Thereafter, the inside temperature of the reaction system was quickly raised to 285° C. and the reaction was continued in high vacuum of 0.1–0.2 mm. Hg under agitation. The intrinsic viscosity of the polymer reached 0.69 after 120 minutes. Whereas, when the high vacuum reaction was interruped 60 minutes after it started to allow the addition of 1.1 parts of di-o-(p-ethylphenyl)-phenyl isophthalate to the system and continued for additional 60 minutes under the same conditions, the resultant polymer had an intrinsic viscosity of 0.89.

The above-described reaction was repeated under exactly the same conditions except that 1.6 parts of di-o-(p-decylphenyl)phenyl isophthalate was added in place of di-o-(p-ethylphenyl)phenyl isophthalate. The resultant polymer had an intrinsic viscosity of 0.67. Thus the objects of the present invention could not be achieved because the aryl group of di-o-(p-decylphenyl)phenyl isophthalate has more than 20 carbons.

Example 20

97 parts of dimethyl terephthalate, 163 parts of (cis-: trans-30:70) cyclohexane dimethanol and 0.04 part of 20% isopropyl alcohol solution of titanic isopropoxide were charged in a reactor provided with a rectification column and heated, while the methanol formed was distilled off the system. After the distillation of methanol completely terminated, the reaction product was transferred into another reactor. Thereafter the reaction temperature was gradually raised to 300° C. within about 30 minutes while the pressure was gradually reduced to 0.1–0.3 mm. Hg, under agitation of 60 r.p.m.

When the system was maintained at said reaction temperature in the high vacuum for 60 minutes, the resultant polymer had an intrinsic viscosity of 0.71 and a softening point of 290° C.

In a reaction similar to the above, the high vacuum reaction was interrupted 30 minutes after it started to allow the addition of 0.7 part of diphenyl terephthalate to the system and further continued for 20 minutes. The resultant polymer had an intrinsic viscosity of 0.90 and a softening point of 289° C.

Example 21

88 parts of dimethyl terephthalate, 10 parts of methyl p-(β-hydroxyethoxy)benzoate, 69 parts of ethylene glycol, 0.04 part of antimony trioxide and 0.07 part of manganese acetate were charged in a reactor provided with a rectification column and heated while the methanol formed was distilled off the system. As the distillation of methanol completely terminated, that of the excessive glycol started, which was also removed from the system. When the inside temperature of the system reached 230° C., the reaction product was transferred into another reactor which was capable of 60 r.p.m. agitation and was so designed that liquid may be fed into the reaction product from the lower part of the reactor. After the said transfer, the inside temperature of the system was raised to 270° C. within 30 minutes while the reaction was advanced at 20 mm. Hg. Then the inside temperature was quickly raised to 280° C. and the reaction was advanced thereunder in high vacuum of 0.1–0.6 mm. Hg. The formed polymer had an intrinsic viscosity of 0.67 after 60 minutes of the high vacuum reaction, and that of 0.83 after 90 minutes of the high vacuum reaction.

In a reaction similar to the above, when 50 minutes passed after the high vacuum reaction started, diphenyl phthalate which was heated in advance to 280° C. was fed to the reactants at the rate of 0.04 part per minute from the lower part of the reactor, while the reaction was continued at 2 mm. Hg. Fifteen minutes after the addition of diphenyl phthalate started, the said addition was stopped and the high vacuum reaction at 0.1–0.6 mm. Hg was continued for additional 10 minutes. The resultant polymer had an intrinsic viscosity of 1.10 and a softening point of 233° C.

Example 22

140 parts of dimethyl sebacate, 71 parts of ethylene glycol, 0.04 part of antimony trioxide and 0.03 part of zinc acetate were charged in a reactor provided with a rectification column and heated while the methanol formed was distilled off the system. As the distillation of methanol completely terminated and that of the excessive glycol started, the latter was also removed from the system. When the inside temperature of the system reached 230° C., the reaction product was transferred into another reactor, and the temperature was gradually raised to 260° C. within about 30 minutes while the reaction was advanced at 20 mm. Hg. Then the temperature was quickly raised to 275° C. and the reaction was continued in the high vacuum of 0.1–1 mm. Hg under agitation of 60 r.p.m. After about 60 minutes of the high vacuum reaction, the intrinsic viscosity of the polymer rose to 0.80.

In a reaction similar to the above, when the high vacuum reaction of 0.1–1 mm. Hg was interrupted 30 minutes after it started to allow addition of 1.6 parts of di-o-phenylphenyl oxalate to the system followed by 2 minutes' mixing with agitation at atmospheric pressure, and the reaction was continued for 3 minutes at 10 mm. Hg and additional 15 minutes at 0.1–1 mm. Hg, the formed polymer had an intrinsic viscosity of 0.97 and a melting point of 81° C.

Example 23

97 parts of dimethyl terephthalate, 69 parts of ethylene glycol, 0.04 part of antimony trioxide and 0.088 part of calcium acetate were charged in a reactor provided with a rectification column and heated while the methanol formed was distilled off the system. As the distillation of methanol completely terminated and that of the excessive glycol started, the latter was also removed from the system. When the inside temperature of the system reached 230° C., the reaction product (precondensate) was transferred into another reactor. Then 0.08 part of 50% aqueous solution of phosphorous acid was added to the system, and the inside temperature was gradually raised to 260° C. within about 30 minutes while the reaction was advanced at a reduced pressure of 20 mm. Hg under agitation. The inside temperature was thereafter quickly raised to 275° C., and the reaction was continued for 50 minutes in high vacuum of 0.1–1 mm. Hg under agitation of 60 r.p.m. At that time the polymer had an intrinsic viscosity of 0.50 (the value inferred from the torque of the agitation).

Separately, the compounds of Formulae A and B.

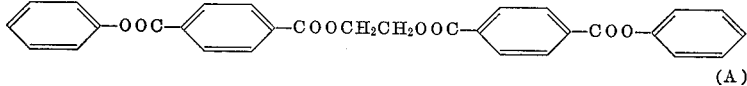

(A)

(B)

were mixed at the weight ratio of A:B=2:1 and melted, and 2.8 parts of the mixture was added to the above reaction system in the high vacuum. About 10 minutes after the addition, the melt viscosity of the reactant rose, and from the system phenol was distilled. The high vacuum reaction was stopped 20 minutes after the addition, at which time the polymer had an intrinsic viscosity of 0.97.

In an experiment similar to the above, when the mixture of the compounds (A) and (B) was replaced by 1.6 parts of molten diphenyl terephthalate, the diphenyl terephthalate violently spattered about and a portion thereof was immediately removed from the system. Again the rise in melt viscosity of the reactant 10 minutes after the addition of the diphenyl terephthalate was smaller than the case wherein the mixture of the compounds (A) and (B) was added, and in the phenol distilled, a minor amount of diphenyl terephthalate was found.

Twenty minutes after the addition of diphenyl terephthalate the high vacuum reaction was stopped. The resultant polymer had an intrinsic viscosity of 0.79.

From this experiment, it can be understood that in case of adding the diaryl dicarboxylate while the vacuum reaction is continued, it is advantageous to add the diaryl dicarboxylate of a high molecular weight which consequently has a high boiling point.

EXAMPLE 24

97 parts of dimethyl terephthalate, 69 parts of ethylene glycol, 0.04 part of antimony trioxide and 0.088 part of calcium acetate were charged in a reactor provided with a rectification column and heated while the methanol formed was distilled off the system. As the distillation of methanol completely terminated and that of the excessive glycol started, the latter was also removed from the system. When the inside temperature of the system reached 230° C., the reaction product was transferred into another reactor which was provided with an agitator and was so designed that an inert gas may be fed into the reactor from the lower part of the agitation axis. Then nitrogen gas preheated to 280° C. at atmospheric pressure was fed into the reactor at the rate of 0.4 part per minute (which has a volume of about 5 times that of the initially charged DMT), while the agitator in the reactor was rotated at 60 r.p.m. In order to maintain the inside pressure of the reactor at about atmospheric level, the introgen gas was constantly purged from the reactor. The reaction temperature was maintained at 280° C., and 100 minutes after the formed polymer had an intrinsic viscosity of 0.46. When the reaction was further continued for 50 minutes under the same conditions, the intrinsic viscosity of the polymer rose to 0.57.

In a similar experiment, the reaction was interrupted 100 minutes after the introduction of the nitrogen gas was started, to allow addition of 1.9 parts of diphenyl terephthalate to the reactant, and continued for additional 50 minutes. Thus formed polymer had an intrinsic viscosity of 0.76.

We claim:
1. In a process for the preparation of polyesters of a high degree of polymerization wherein at least one dibasic acid or a lower aliphatic ester thereof is reacted in a first step with at least one dihydric alcohol or a functional derivative thereof and, the product of such reaction is subjected to condensation polymerization catalyst in an atmosphere of reduced pressure or inert gaseous current in a second step, the improvement which comprises adding to the reaction mixture of said second step at a time when the intrinsic viscosity of said reaction mixture is no less than 0.35 (as calculated from the measured value as to its orthochlorophenol solution at 35° C.) a diaryl ester of a dicarboxylic acid of the formula:

AOOC—(X)$_n$—COOB wherein $n$ is an integer of zero or 1; X is a divalent organic group selected from divalent aromatic, substituted aromatic, wherein such substitution is selected from alkyl and halogen, aromatic groups in which two aromatic rings are bonded through an atomic group selected from —CH$_2$—, —CH$_2$—CH$_2$—, —O— and —SO$_2$—, aliphatic, alicyclic and aralkylene groups; and A and B are independently selected from monovalent aryl group of 6 to 20 carbon atoms and substituted aryl group of 6 to 20 carbon atoms wherein said substitution comprises a non-ester forming substituent, said non-ester forming substituent being selected from alkyl, halogen, phenyl, phenoxy and phenylsulfonyl.

2. The process according to claim 1 in which the diaryl ester of dicarboxylic acid is added to the molten polyester having an intrinsic viscosity ranging from 0.35 to 1.5.

3. The process according to claim 1 in which the diaryl ester of dicarboxylic acid represented by the given formula is added to the molten polyester by single time addition.

4. The process according to claim 1 in which the diaryl ester of dicarboxylic acid represented by the given formula is continuously added to the molten polyester.

5. The process according to claim 2, in which diphenyl terephthalate is used as the diaryl ester of dicarboxylic acid.

6. In a process for the preparation of polyesters of a high degree of polymerization wherein at least one dibasic acid or a lower aliphatic ester thereof is reacted in a first step with at least one dihydric alcohol or a functional derivative thereof and, the product of such reaction is subjected to condensation polymerization by heating in the presence of a condensation polymerization catalyst in an atmosphere of reduced pressure or inert gaseous current in a second step, the improvement which comprises adding to the reaction mixture of said second step at a time when the intrinsic viscosity of said reaction mixture is no less than 0.35 (as calculated from the measured value as to its orthochlorophenol solution at 35° C.) a diaryl ester of a dicarboxylic acid of the formula:

AOOC—(X)$_n$—COOB wherein $n$ is an integer of zero or 1; X is a divalent organic group selected from divalent aromatic, substituted aromatic, wherein such substitution is selected from alkyl and halogen, aromatic groups in which two aromatic rings are bonded through an atomic group selected from —CH$_2$—, —CH$_2$—CH$_2$—, —O— and —SO$_2$—, aliphatic, alicyclic and aralkylene groups; and A and B are independently selected from monovalent aryl group of 6 to 20 carbon atoms and substituted aryl group of 6 to 20 carbon atoms wherein said substitution comprises a non-ester forming substituent; said non-ester forming substituent being selected from alkyl, halogen, phenyl, phenoxy and phenylsulfonyl; and said diaryl ester of dicarboxylic acid being added in a manner that at least the amount of one time addition thereof does not exceed the value M given by the formula:

$$M \leq [\eta_0]^2 - 3.5[\eta_0] \times 3.2$$

in which [$\eta_0$] stands for the intrinsic viscosity of the polyester at the time of addition of the diaryl ester of dicarboxylic acid, and M is the maximum allowable amount of addition of the diaryl ester of dicarboxylic acid expressed in terms of mol percent to the acid component of the polyester.

7. The process according to claim 2, in which the diaryl ester of dicarboxylic acid is added in such a manner that the total amount of addition thereof before completion of the polymerization reaction is no less than [1/5 M+0.01] mol percent to the total amount of the dibasic acid or its lower aliphatic ester used.

8. The process according to claim 2, in which the diaryl ester of dicarboxylic acid represented by the given formula is added to the molten polyester at least twice at certain time interval, the amount of one time addition being no more than the value M.

9. The process according to claim 2 in which diphenyl terephthalate is added to molten polyethylene terephthalate having an intrinsic viscosity ranging from 0.35 to 0.85 (as calculated from the measured value as to orthochlorophenol solution of the polyethylene terephthalate at 35° C.) which is obtained by reacting terephthalic acid or its lower alkyl ester 1–4 carbons with ethylene glycol, to form polyethylene terephthalate having an intrinsic viscosity (as defined in the above) greater than 0.85.

References Cited

UNITED STATES PATENTS 2,973,341 2/1961 Hippe et al.
3,013,914 12/1961 Willard _____ 260—75
2,465,319 3/1949 Whinfield et al. _____ 260—75

WILLIAM H. SHORT, *Primary Examiner.*

M. GOLDSTEIN, *Assistant Examiner.*